US005329307A

United States Patent [19]

Takemura et al.

[11] Patent Number: 5,329,307

[45] Date of Patent: Jul. 12, 1994

[54] IMAGE FORMING APPARATUS AND METHOD OF CONTROLLING IMAGE FORMING APPARATUS

[75] Inventors: Osamu Takemura, Hyogo; Masaaki Yukawa; Shinji Koga, both of Osaka; Takahiko Kimura, Ixoma, all of Japan

[73] Assignee: Mita Industrial Co., Ltd., Japan

[21] Appl. No.: 17,448

[22] Filed: Feb. 12, 1993

Related U.S. Application Data

[63] Continuation-in-part of Ser. No. 884,146, May 18, 1992, abandoned.

[30] Foreign Application Priority Data

May 21, 1991 [JP] Japan ................................ 3-145373

[51] Int. Cl.[5] ............................................ G01D 15/06

[52] U.S. Cl. ................................ 346/153.1; 346/155; 346/159

[58] Field of Search ..................... 346/153.1, 154, 155, 346/159; 355/245

[56] References Cited

U.S. PATENT DOCUMENTS 4,435,066 3/1984 Tarumi et al. ...................... 346/159
4,478,510 10/1984 Fujii et al. .......................... 346/159
4,568,955 2/1986 Hosoya et al. ................... 346/153.1
4,814,796 3/1989 Schmidlin .......................... 346/155
4,860,036 8/1989 Schmidlin .......................... 346/159
4,903,049 2/1990 Sotack ................................ 346/159
5,095,322 3/1992 Fletcher ....................... 346/153.1 X
5,153,611 10/1992 Kokado et al. ................ 346/159 X
5,170,185 12/1992 Takemura et al. ............ 346/159 X
5,204,696 4/1993 Schmidlin et al. ................. 346/155

*Primary Examiner*—Fred L. Braun
*Attorney, Agent, or Firm*—Beveridge, DeGrandi, Weilacher & Young

[57] ABSTRACT

An image forming apparatus includes a developer supplying roller for supplying to a predetermined print position a developer charged to predetermined polarity, and a print head provided in the print position and having electrode pairs which are respectively provided with developer passing holes, each pair including a first electrode and a second electrode connecting with each other, and being so adapted that the developer passing holes are opened or closed by control of an electric field between the first and second electrodes, on the basis of whether print dot data is sent in synchronization with a predetermined print clock signal. At a time when the print dot data is sent in synchronism with the print clock signal, the electric field is controlled such that the developer is attracted from the developer supplying roller to the first electrode. On the other hand, at a time when the print dot data is not sent in synchronism with the print clock signal, the electric field is controlled such that the developer is attracted from the first electrode to the developer supplying roller. Further, in the image forming apparatus in accordance with the present invention, an ultrasonic vibration applying device is contemplated as applying ultrasonic vibration to the print head.

9 Claims, 4 Drawing Sheets

IMAGE FORMING APPARATUS AND METHOD OF CONTROLLING IMAGE FORMING APPARATUS

This application is a continuation-in-part of application Ser. No. 07/884,146 which was filed on May 18, 1992 and which was abandoned as of the filing date of this application.

BACKGROUND OF THE INVENTION

1. Field of the Invention

The present invention relates to image forming apparatuses such as a printer and a copying machine and a method of controlling the image forming apparatuses.

2. Description of the Prior Art

Examples of a printer conventionally known include one comprising a developer supplying roller 1 for supplying to a predetermined print position a developer T charged to predetermined polarity, for example, negatively charged, a print head 6 provided in the print position and having an electrode pair, which is provided with a developer passing hole 2, comprising an upper first electrode 3 and a lower second electrode 4 connecting with each other, and a paper feeding roller 7 for feeding paper P to the print position, and so adapted that the developer passing hole 2 is opened or closed in a potential manner by the control of the potentials of the first electrode 3 and the second electrode 4 on the basis of print dot data sent in synchronization with a predetermined print clock signal.

Although in the print head 6, a plurality of electrode pairs each comprising a first electrode 3 and a second electrode 4 are actually arranged in a matrix shape with an insulating substrate 5 being interposed therebetween and respectively provided with a plurality of developer passing holes 2, only one electrode pair comprising a first electrode 3 and a second electrode 4 is illustrated for convenience.

The first electrode 3 is grounded. A predetermined positive voltage V3 is applied to the paper feeding roller 7. Consider a case where the print dot data is printed. In this case, when V1 is taken as the potential of the first electrode 3 and V2 is taken as the potential of the second electrode 4, the potential V2 of the second electrode 4 is so controlled that $V1<V2<V3$. Consequently, a developer T passes through the developer passing hole 2 in the print head 6 from the developer supplying roller 1 and adheres to the paper P by an electric field formed by the first and second electrodes 3 and 4 as well as the paper feeding roller 7.

Consider a case where the print dot data is unprinted. In this case, the potential V2 of the second electrode 4 is so controlled that $V1>V2$. Consequently, the developer T is prevented from passing through the developer passing hole 2 in the print head 6 by an electric field formed by the first electrode 3 and the second electrode 4.

In such a printer, the developer T is not sufficiently supplied to the developer passing hole 2. Accordingly, such an electric field that the developer T is attracted from the developer supplying roller 1 to the first electrode 3 has been conventionally always generated between the developer supplying roller 1 and the first electrode 3. More specifically, assuming that the developer T is negatively charged, the positive pole of a DC power supply 12 is connected to the first electrode 3 and the negative pole of the DC power supply 12 is connected to the developer supplying roller 1, as shown in FIG. 3.

If such an electric field that the developer T is attracted from the developer supplying roller 1 to the first electrode 3 is always generated between the developer supplying roller 1 and the first electrode 3, the developer T is sufficiently supplied to the developer passing hole 2. Since the developer T is also supplied to developer passing holes 2 other than the developer passing hole 2 corresponding to the print dot data which is printed, however, the developer passing holes 2 are clogged with the developer T.

SUMMARY OF THE INVENTION

An object of the present invention is to provide an image forming apparatus in which a developer is sufficiently supplied to developer passing holes and the developer passing holes are not clogged with the developer and a method of controlling the image forming apparatus.

In a first image forming apparatus according to the present invention comprising a developer supplying roller for supplying to a predetermined print position a developer charged to predetermined polarity, and a print head provided in the print position and having electrode pairs, which are respectively provided with developer passing holes, each comprising an upper electrode and a lower electrode connecting with each other, and so adapted that the above described developer passing holes are opened or closed in a potential manner by the control of either one or both of the potentials of the above described upper and lower electrodes on the basis of print dot data sent in synchronization with a predetermined print clock signal. The image forming apparatus is characterized by a first means for generating such an electric field such that the above described developer is attracted from the above described developer supplying roller to the above described upper electrode between the developer supplying roller and the upper electrode at a time when the print dot data is sent in the above described print clock signal, and second means for generating such an electric field that the above described developer is attracted from the above described upper electrode to the above described developer supplying roller between the developer supplying roller and the upper electrode at timing when the print dot data is not sent in the above described print clock signal.

In a second image forming apparatus according to the present invention comprising a developer supplying roller for supplying to a predetermined print position a developer charged to predetermined polarity, and a print head provided in the print position and having electrode pairs, which are respectively provided with developer passing holes, each comprising an upper electrode and a lower electrode connecting with each other, and so adapted that the above described developer passing holes are opened or closed in a potential manner by the control of either one or both of the potentials of the above described upper and lower electrodes on the basis of print dot data sent in synchronization with a predetermined print clock signal, the image forming apparatus is characterized in that the above described upper electrode is grounded, two power supplies, which differ in polarity, selectively connected to the above described developer supplying roller and the ground by a selecting switch are positioned between the developer supplying roller and the ground, the above described selecting switch is so controlled that a power supply for generating such an electric field that the above described developer is attracted from the developer supplying roller to the upper electrode between the developer supplying roller and the upper electrode is selected out of the above described two power supplies at timing when the print dot data is sent in the above described print clock signal, and the above described selecting switch is so controlled that a power supply for generating such an electric field that the above described developer is attracted from the upper electrode to the developer supplying roller between the developer supplying roller and the upper electrode is selected out of the two power supplies at a time when the print dot data is not sent in the above described print clock signal.

A third image forming apparatus according to the present invention is arranged as described hereinabove in connection with the first image forming apparatus, but further includes an ultrasonic vibration applying device. The vibration device is attached tot he print head to apply ultrasonic vibrations thereto. The applied ultrasonic vibration acts to compensate for forces and conditions which tend to cause developer particles to aggregate. The vibration compensates for cohesive forces between the developer particles as they are supplied by control of the electrodes.

A forth image forming apparatus likewise is provided in accordance with the present invention. In the fourth apparatus, the apparatus is generally configured as described in connection with the second image forming apparatus as described above, except that it too includes an ultrasonic vibration applying device.

A method of controlling an image forming apparatus according to the present invention in which a developer charged to predetermined polarity is supplied to a predetermined print position by a developer supplying roller, a print head having electrode pairs, which are respectively provided with developer passing holes, each comprising an upper electrode and a lower electrode connecting with each other is provided in the print position, and the above described developer passing holes are opened or closed in a potential manner by the control of either one or both of the potentials of the above described upper and lower electrodes on the basis of print dot data sent in synchronization with a predetermined print clock signal, the method is characterized in that such an electric field that the above described developer is attracted from the above described developer supplying roller to the above described upper electrode is generated between the developer supplying roller and the upper electrode at a time when the print dot data is sent in the above described print clock signal, and such an electric field that the above described developer is attracted from the above described upper electrode to the above described developer supplying roller is generated between the developer supplying roller and the upper electrode at a time when the print dot data is not sent in the above described print clock signal.

The above-described method of controlling an image forming apparatus further is contemplated as comprising a step of applying ultrasonic vibrations to the print head.

According to the present invention, such an electric field that the developer is attracted from the developer supplying roller to the upper electrode is generated between the developer supplying roller and the upper electrode at a time when the print dot data is sent in the print clock signal. In this case, therefore, the developer is sufficiently supplied to the developer passing holes.

On the other hand, such an electric field that the developer is attracted from the upper electrode to the developer supplying roller is generated between the developer supplying roller and the upper electrode at a time when the print dot data is not sent in the print clock signal. Consequently, when the print dot data is not printing at timing when the preceding print dot data is sent, the developer in the vicinity of all the developer passing holes is returned to the developer supplying roller. On the other hand, when the print dot data is printed at a time when the preceding print dot data is sent, the developer in the vicinity of developer passing holes other than the developer passing hole corresponding to the print dot data is returned to the developer supplying roller. Consequently, the developer passing holes are prevented from being clogged with the developer.

More specifically, according to the present invention, the developer is sufficiently supplied to the developer passing holes, and the developer passing holes are prevented from being clogged with the developer.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
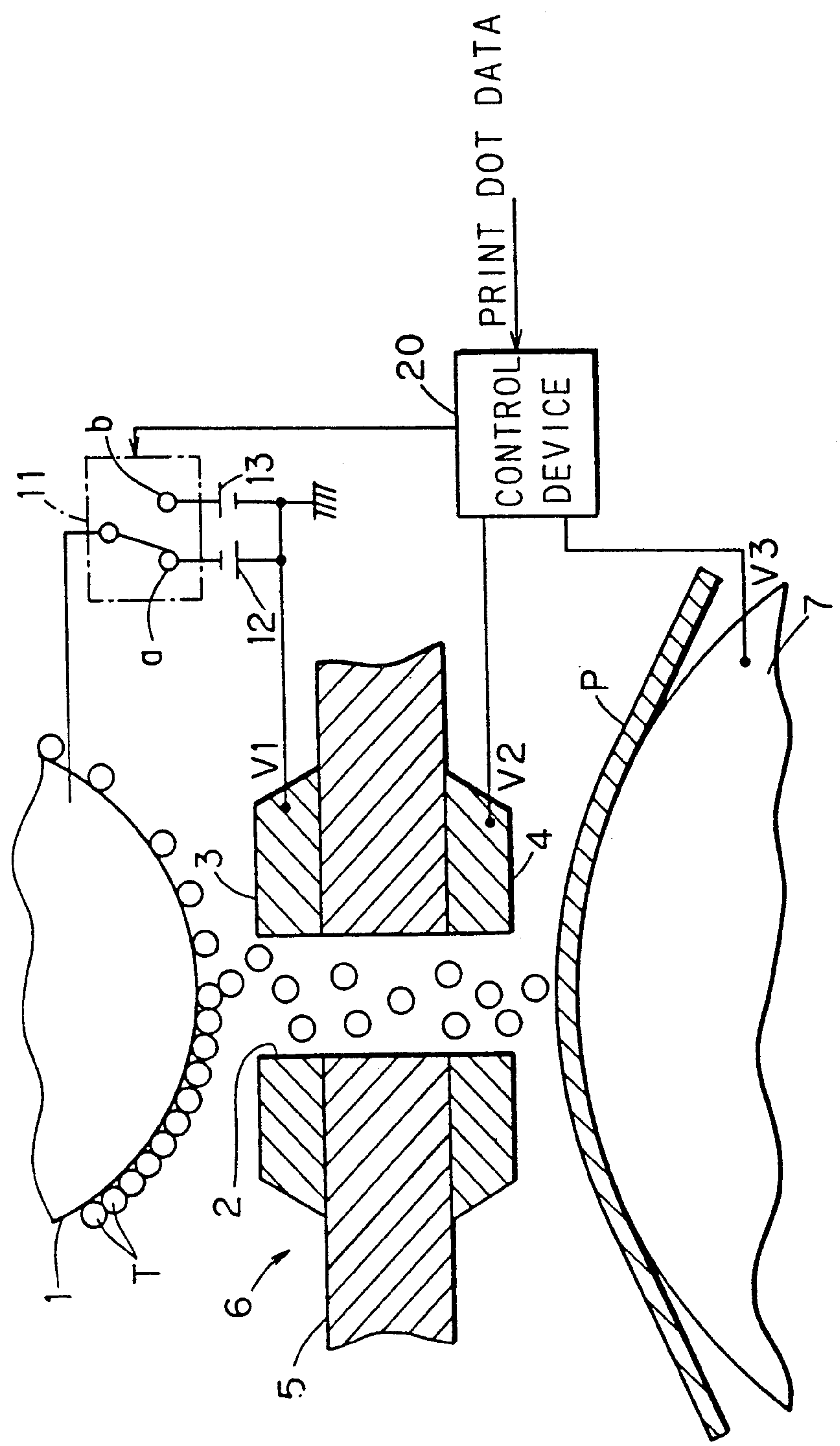
FIG. 1 is a schematic diagram showing the construction of a printer according to an embodiment of the present invention.
Figure 2:
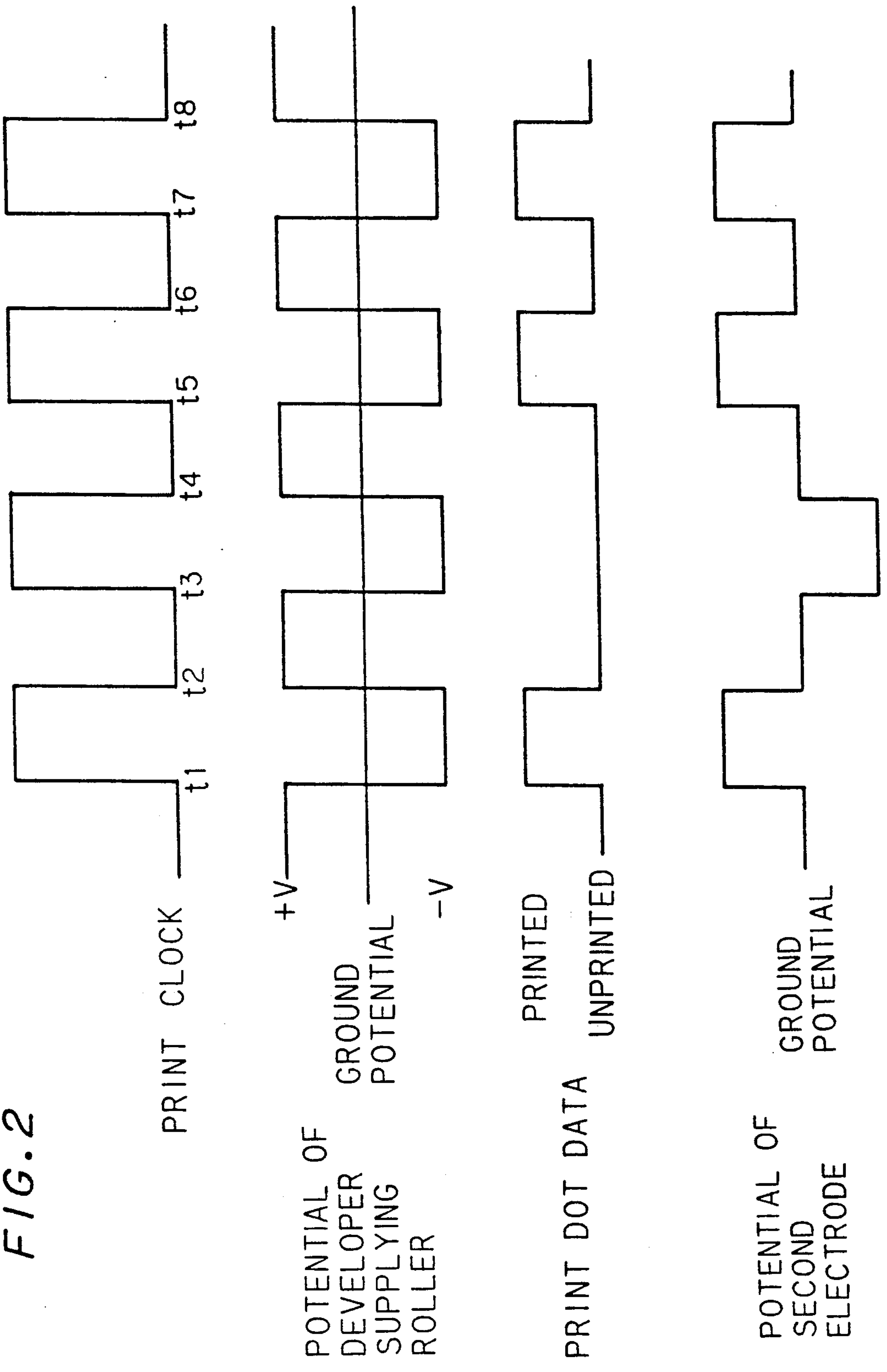
FIG. 2 is a timing chart showing the potential of a developer supplying roller corresponding to a print clock signal.
Figure 3:
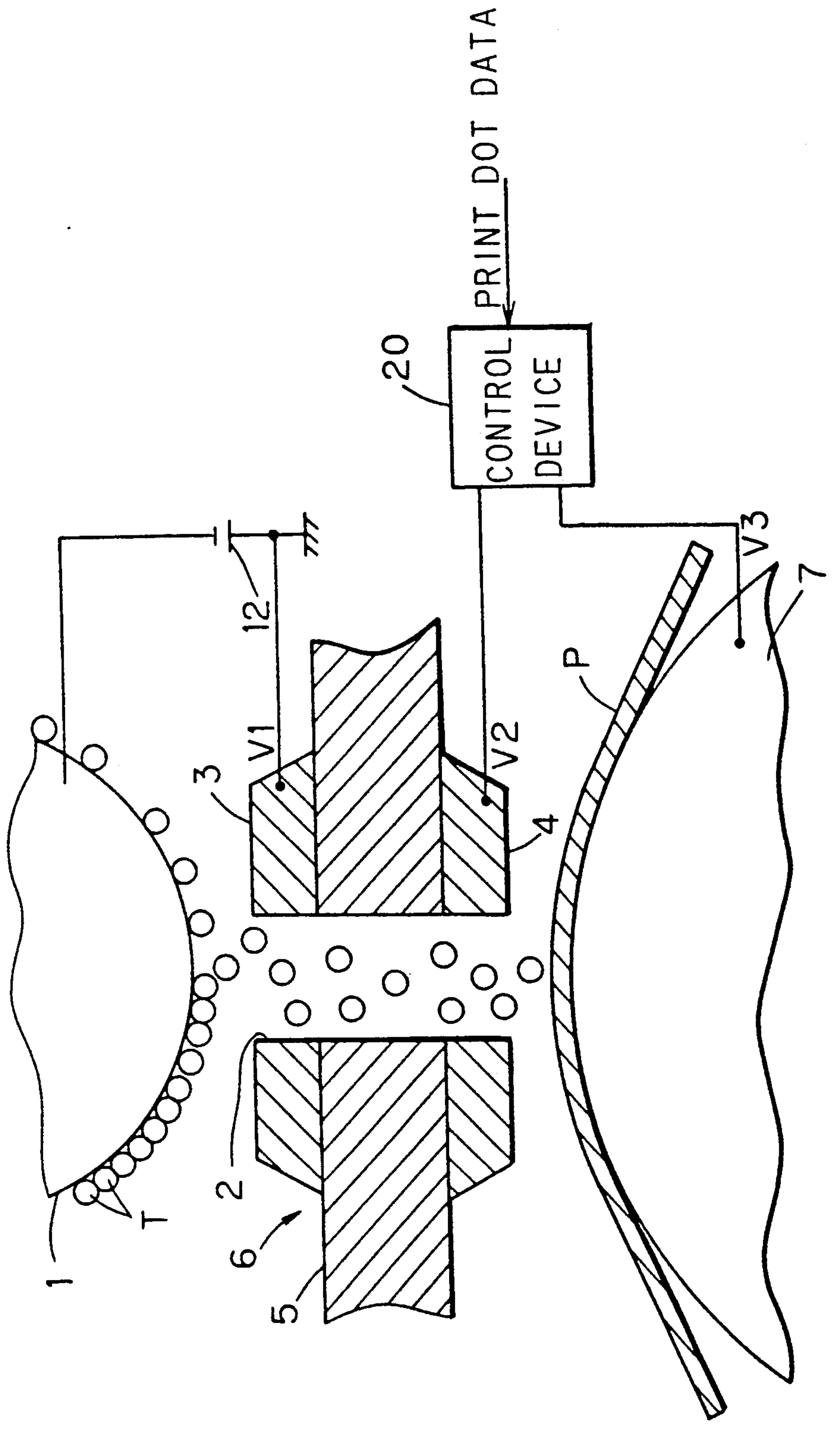
FIG. 3 (PRIOR ART)
FIG. 3 is a schematic diagram showing the construction of a printer in a conventional example.

Referring now to FIGS. 1 and 2, description is made of an embodiment of the present invention which is applied to a printer.

The printer comprises a developer supplying roller 1 for supplying to a predetermined print position a developer T charged to predetermined polarity and particularly, negatively charged in this example, a print head 6 provided in the print position and having an electrode pair, which is provided with a developer passing hole 2, comprising an upper first electrode 3 and a lower second electrode 4 connecting with each other, and a paper feeding roller 7 for feeding paper P to the print position.

Although in the print head 6, a plurality of electrode pairs each comprising a first electrode 3 and a second electrode 4 are actually arranged in a matrix manner with an insulating substrate 5 being interposed therebetween and respectively provided with a plurality of developer passing holes 2, only one electrode pair comprising a first electrode 3 and a second electrode 4 is illustrated for convenience.

The first electrode 3 is grounded. A predetermined positive potential V3 is applied to the paper feeding roller 7 by a control device 20. DC power supplies 12 and 13 which are opposite in polarity are positioned between the developer supplying roller 1 and the ground so as to be selectively connected to the developer supplying roller 1 and the ground through a selecting switch 11. The switching of the selecting switch 11 and the potential of the second electrode 4 are controlled by the control device 20. The control device 20 controls the switching of the selecting switch 11 and the potential of the second electrode 4 on the basis of print dot data sent in synchronization with a print clock signal.

Referring to FIG. 2, the selecting switch 11 is switched to the side of a switching contact a at timing when the print dot data is sent in the print clock signal (when the print clock signal is at a high level in this example). In this case, therefore, the DC power supply 12 is selected, so that the potential of the developer supplying roller i is lower than the ground potential which is the potential of the first electrode 3, to generate such an electric field that the developer T is attracted from the developer supplying roller I to the first electrode 3 between the developer supplying roller 1 and the first electrode 3. Therefore, the developer T is sufficiently supplied to the developer passing hole 2.

Consider a case where the print dot data is printed (t1 to t2, t5 to t6, and t7 to t8). In this case, when V1 is taken as the potential of the first electrode 3, V2 is taken as the potential of the second electrode 4, and V3 is taken as the potential of the paper feeding roller 7, the potential of the second electrode 4 is so controlled that $V1<V2<V3$. Consequently, the developer T passes through the developer passing hole 2 in the print head 6 from the developer supplying roller 1 and adheres to the paper P by an electric field formed by the first and second electrodes 3 and 4 as well as the paper feeding roller 7.

Consider a case where the print dot data is unprinted (t3 to t4). In this case, the potential V2 of the second electrode 4 is so controlled that $V1>V2$. Consequently, the developer T is prevented from passing through the developer passing hole 2 in the print head 6 by an electric field formed by the first and second electrodes 3 and 4.

At timing when the print dot data is not sent in the print clock signal (when the print clock signal is at a low level in this example), the selecting switch 11 is switched to the side of a switching contact b. In this case, therefore, the DC power supply 13 is selected, so that the potential of the developer supplying roller 1 is higher than the ground potential which is the potential of the first electrode 3, as shown in FIG. 2, to generate such an electric field that the developer T is attracted from the first electrode 3 to the developer supplying roller 1 between the developer supplying roller 1 and the first electrode 3. Consequently, when the print dot data is unprinted at timing when the preceding print dot data is sent, the developer T in the vicinity of the developer passing hole 2 is returned to the developer supplying roller 1. Therefore, the developer passing hole 2 is prevented from being clogged with the developer T.

As described in the foregoing, such an electric field that the developer T is attracted from the developer supplying roller 1 to the first electrode 3 is generated between the developer supplying roller 1 and the first electrode 3 at the time when the print dot data is sent in the print clock signal, while such an electric field that the developer T is attracted from the first electrode 3 to the developer supplying roller 1 is generated between the developer supplying roller 1 and the first electrode 3 at the time when the print dot data is not sent in the print clock signal. Consequently, the developer passing hole 2 is prevented from being clogged with the developer T, and the developer T is sufficiently supplied to the developer passing hole 2 when the print dot data is printed.

In the print head 6, the plurality of electrode pairs each comprising the first electrode 3 and the second electrode 4 are arranged in a matrix shape with the insulating substrate 5 being interposed therebetween and respectively provided with the plurality of developer passing holes, as described above. In such a case, a potential between the electrode pair 3 and 4 provided with the developer passing hole 2 which corresponds to dots of the print dot data sent this time is controlled in conformity with the print dot data. In addition, the potential V2 of the second electrode 4 in the electrode pair 3 and 4 which does not correspond to the dots of the print dot data sent this time is made lower than the potential V1 of the first electrode 3 in the electrode pair 3 and 4.

As previously mentioned, a plurality of developer passing holes 2 is provided. Accordingly, in a case where the selecting switch 11 is switched to the side of the switching contact b at timing when the print dot data is not sent in the print clock signal, data is unprinted at time when the preceding print dot the developer T in the vicinity of all the developer passing holes is returned to the developer supplying roller. On the other hand, when the print dot data is printed at a time when the preceding print dot data is sent, the developer T in the vicinity of the developer passing holes other than the developer passing hole corresponding to the print dot data is returned to the developer supplying roller.

Although description was made of a case where the developer T is negatively charged, it goes without saying that the present invention is applicable to a case where the developer T is positively charged.

Figure 4:
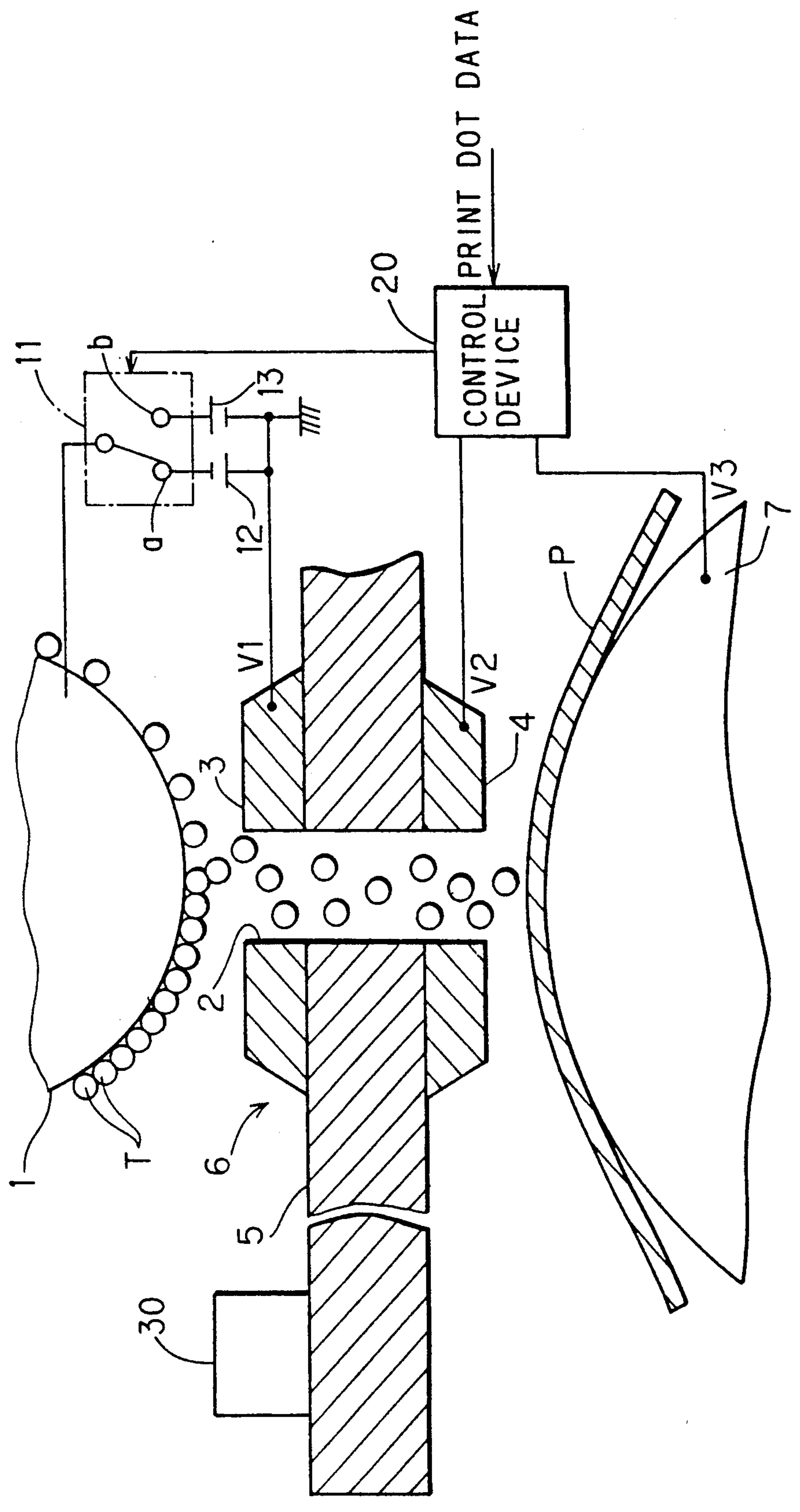
FIG. 4 is a schematic diagram showing a second embodiment of the present invention.

FIG. 4 shows an alternative embodiment which incorporates an ultrasonic vibrator 30. Otherwise, the embodiment of FIG. 4 is similar to that of FIG. 1, and like reference numerals identify like elements therein. Ultrasonic vibrator 30 may comprise, for example, a ceramic vibrator which uses titanate zirconate: PZT. Vibrator 30 is attached to the print head 6 in a known suitable way.

Various physical forces such as Van der Waal's forces and electrostatic forces are exerted on powder particles having a diameter of approximately 10 μm, such as developer particles (toner particles). Thus, the powder particles can easily aggregate. Consequently, it can be difficult to supply developer from the developer supplying roller 1 to the first electrode 3 in the form of single particles. In such a case, a great number of developer particles are temporarily supplied to the first electrode 3, such that control over developer supplying is reduced. Further, if this progresses to an extreme condition, the developer passage hole 2 between the first electrode 3 and the second electrode 4 clogs with developer and thus prevents the further passage thereof. In this situation, no image can be formed.

To overcome these conditions, ultrasonic vibration is applied to the print head 6 by the ultrasonic vibrator 30. The ultrasonic vibration decreases cohesive force between the developer particles supplied from the exterior of the electrodes to reduce aggregated developer to single particles. In addition, the first electrode 3 and the second electrode 4 are so constructed that they are laminated to both surfaces of an insulator. Accordingly, the developer particles may adhere to the wall surface of the insulator (the inner wall of the developer passage hole 2) by charges on the developer particles themselves. The ultrasonic vibration caused by the ultrasonic vibrator 30 further prevents the developer particles from adhering to the inner wall of passage hole 2.

By applying ultrasonic vibration to the print head 6 by the ultrasonic vibrator 30, the developer is made sensitive to the electric field developed between the developer supplying roller 1 and the first electrode 3. Additionally, the developer does not easily adhere to the first electrode 3, so that the field strength between the developer supplying roller 1 and the first electrode 3 is not weakened by developer adhering to the first electrode 3. Consequently, it is possible to decrease the absolute value of the supply voltage for the developer supplying roller 1. Since it is possible to so decrease the absolute value of the supply voltage to the developer supplying roller 1, clogging of the passage hole 2 by developer can be prevented by switching the supply voltage to the developer supplying roller 1 during the process of performing printing processing on recording paper.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In an image forming apparatus comprising a developer supplying roller for supplying to a predetermined print position, a developer charged to a predetermined polarity, and a print head provided in the print position and having electrode pairs which are respectively provided with developer passing holes, each electrode pair comprising a first electrode and a second electrode connecting with each other and adapted such that said developer passing holes are opened and closed by control of an electric field generated between said first and second electrodes on the basis of print dot data sent in synchronization with a predetermined print clock signal, the image forming apparatus comprising:

first means for generating said electric field such that said developer is attracted from said developer supplying roller to said first electrode between said developer supplying roller and said first electrode at a time when the print dot data is sent in synchronism with said print clock signal; and second means for generating said electric field such that said developer is attracted from said first electrode to said developer supplying roller between said developer supplying roller and said first electrode at a time when the print dot data is not sent in synchronism with said print clock signal.

2. In an image forming apparatus comprising a developer supplying roller for supplying to a predetermined print position, a developer charged to a predetermined polarity, and a print head provided in the print position and having electrode pairs which are respectively provided with developer passing holes, each electrode pair comprising a first electrode and a second electrode connecting with each other and adapted such that said developer passing holes are opened and closed by control of an electric field generated between said first and second electrodes on the basis of print dot data sent in synchronization with a predetermined print clock signal, wherein said first electrode is grounded, power supplies, which differ in polarity and which are selectively connected to said developer supplying roller and ground by a selecting switch, are positioned between said developer supplying roller and ground, said selecting switch is so controlled that a power supply for generating said electric field such that said developer is attracted from said developer supplying roller to said first electrode between said developer supplying roller and said first electrode is selected from said power supplies at a time when the print dot data is sent in synchronism with said print clock signal, and said selecting switch is so controlled that a power supply for generating said electric field such that said developer is attracted from said first electrode to said developer supplying roller between said developer supplying roller and said first electrode is selected from said power supplies at a time when the print dot data is not sent in synchronism with said print clock signal.

3. In an image forming apparatus comprising:

a developer supplying roller for supplying to a predetermined print position, a developer charged to a predetermined polarity;

a print head provided in the print position and having electrode pairs which are respectively provided with developer passing holes, each electrode pair including a first electrode and a second electrode connecting with each other and adapted such that said developer passing holes are opened and closed by control of an electric field generated between said first and second electrodes on the basis of print dot data sent in synchronization with a predetermined print clock signal;

first means for generating said electric field such that during printing said developer is attracted from said developer supplying roller to said first electrode between said developer supplying roller and said first electrode at a time when the print dot data is sent in synchronism with said print clock signal;

second means for generating said electric field such that during printing said developer is attracted from said first electrode to said developer supplying roller between said developer supplying roller and said first electrode at a time when the print dot data is not sent in synchronism with said print clock signal; and means for applying ultrasonic vibration to said print head.

4. An image forming apparatus as claimed in claim 3, wherein during said time when said print dot data is sent and said print dot data is a signal to not print, said first electrode has a potential greater than that of said second electrode.

5. In an image forming apparatus comprising:

a developer supplying roller for supplying to a predetermined print position, a developer charged to a predetermined polarity;

a print head provided in the print position and having electrode pairs which are respectively provided with developer passing holes, each electrode pair comprising a first electrode and a second electrode connecting with each other and adapted such that said developer passing holes are opened and closed by control of an electric field generated between said first and second electrodes on the basis of print dot data sent in synchronization with a predetermined print clock signal; and means for applying ultrasonic vibration, wherein said first electrode is grounded, power supplies, which differ in polarity and which are selectively connected to said developer supplying roller and ground by a selecting switch, are positioned between said developer supplying roller and ground, said selecting switch is so controlled that a power supply for generating said electric field such that said developer is attracted from said developer supplying roller to said first electrode between said developer supplying roller and said first electrode is selected from said power supplies at a time when the print dot data is sent in synchronism with said print clock signal, said selecting switch is so controlled that a power supply for generating said electric field such that said developer is attracted from said first electrode to said developer supplying roller between said developer supplying roller and said first electrode is selected from said power supplies at a time when the print dot data is not sent in synchronism with said print clock signal, and said means for applying ultrasonic vibration applies ultrasonic vibration to said print head.

6. An image forming apparatus as claimed in claim 5, wherein during said time when said print dot data is sent and said print dot data is a signal to not print, said first electrode has a potential greater than that of said second electrode.

7. In a method of controlling an image forming apparatus in which a developer charged to a predetermined polarity is supplied to a predetermined print position by a developer supplying roller, a print head having electrode pairs which are respectively provided with developer passing holes, each electrode pair comprising a first electrode and a second electrode connecting with each other are provided in the print position, and said developer passing holes are opened and closed by control of an electric field generated between said first and second electrodes on the basis of print dot data sent in synchronization with a predetermined print clock signal, the method comprising the steps of:

generating said electric field such that said developer is attracted from said developer supplying roller to said first electrode, said electric field being generated between said developer supplying roller and said first electrode at a time when the print dot data is sent in synchronism with said print clock signal, and generating said electric field such that said developer is attracted from said first electrode to said developer supplying roller, said electric field being generated between said developer supplying roller and said first electrode at a time when the print dot data is not sent in synchronism with said print clock signal.

8. A method of controlling an image forming apparatus in which: a developer is charged to a predetermined polarity and is supplied to a predetermined print position by a developer supplying roller, a print head has electrode pairs which are respectively provided with developer passing holes, each electrode pair including a first electrode and a second electrode connecting with each other and provided in the print position, said developer passing holes being opened and closed by control of an electric field generated between said first and second electrodes on the basis of print dot data sent in synchronization with a predetermined print clock signal, and a means is provided for applying ultrasonic vibration, said method comprising the steps of:

generating said electric field such that during printing said developer is attracted from said developer supplying roller to said first electrode, said electric field being generated between said developer supplying roller and said first electrode at a time when the print dot data is sent in synchronism with said print clock signal, generating said electric field such that during printing said developer is attracted from said first electrode to said developer supplying roller, said electric field being generated between said developer supplying roller and said first electrode at a time when the print dot data is not sent in synchronism with said print clock signal, and applying ultrasonic vibration to said print head by said means for applying ultrasonic vibration.

9. An image forming method as claimed in claim 8, wherein during said time when said print dot data is sent and said print dot data is a signal to not print, said first electrode has a potential greater than that of said second electrode.

* * * * *